Figure 1:
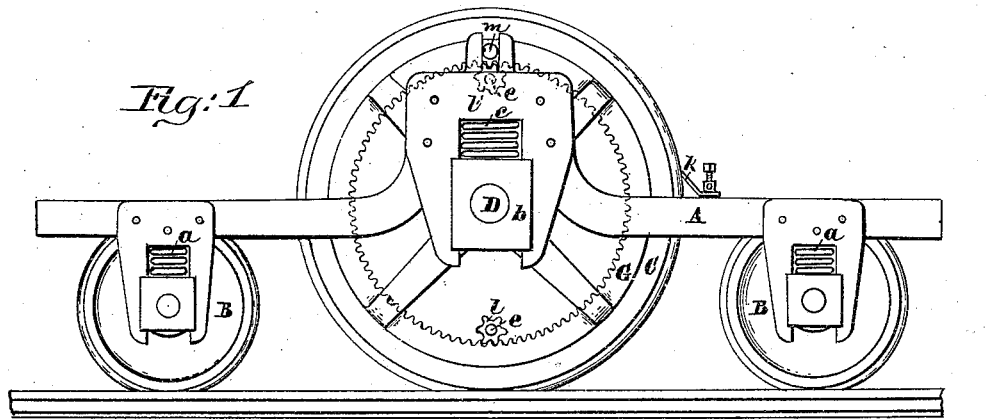

(No Model.) 2 Sheets—Sheet 1.

E. DUMMER.
ELECTRIC LOCOMOTIVE.

No. 428,669. Patented May 27, 1890.

Witnesses:
Wm. E. Woodward,
Thos. W. Hobday

Inventor:
Edward Dummer (No Model.) 2 Sheets—Sheet 2.

E. DUMMER.
ELECTRIC LOCOMOTIVE.

No. 428,669. Patented May 27, 1890.

Witnesses;  
William C. Borthell,  
O. Wm. E. Woodward.

Inventor;  
Edward Dummer

UNITED STATES PATENT OFFICE.

EDWARD DUMMER, OF NEWTON, MASSACHUSETTS.

ELECTRIC LOCOMOTIVE.

SPECIFICATION forming part of Letters Patent No. 428,669, dated May 27, 1890.

Application filed February 17, 1887. Serial No. 227,986. (No model.)

*To all whom it may concern:*

Be it known that I, EDWARD DUMMER, a citizen of the United States, residing at Auburndale, in the city of Newton, county of Middlesex and State of Massachusetts, have invented a new and useful Improvement in Electric Locomotives, of which the following is a specification, reference being had to the accompanying drawings.

My invention relates to locomotives propelled by electricity—that is, to wheeled vehicles which embody or support electric motors for the propulsion thereof.

It has heretofore been the practice to locate the electric motor on the axle, frame, or body of the vehicle, so that there will be rotation of the axle in bearings supporting the motor as to the whole or heavier part thereof, and also supporting such pulleys and belts or chains, gearing, &c., as are employed between the driving-wheels or their axles and the motor-shaft. This method has certain objectionable features, and is accompanied by certain serious difficulties. The weight of the motor and motive mechanism, which in a powerful locomotive must be very great, causes a proportional degree of friction at the supporting-bearings on the axle. There should be springs between the axle and load to prevent damaging jolts or jars. While belts or chains between the motor and axle permit the use of such springs and the consequent vertical motion of the axle with reference to the load, they cause considerable friction, are constantly stretching, and are otherwise objectionable. When gearing is employed, there can be no springs between the motor-shaft and the axle; but the motor must ride "dead" on the axle, in order that the elements of the gearing may be maintained in proper relative position.

My invention is free from such objections and difficulties. According to it the motor, or the heavier part thereof, is not supported by bearings in which the axle revolves, and hence there is no corresponding friction, and when gearing is employed the elements thereof may be in true working position with reference to each other without the detrimental results above referred to.

My invention consists, fundamentally, in an electric locomotive so constructed as to embody one or more field-magnets connected with the driving wheel or wheels to revolve therewith, while each field-magnet may be magnetized constantly in one and the same sense, and thus be supported as one body with the wheel or wheels directly by the rails of a railway, the invention also consisting in the combination of gearing when gearing is required and other parts of the motor and motor mechanism with the driving wheel or wheels and frame of the locomotive, as hereinafter set forth, and specifically pointed out in the claims.

Figure 2:
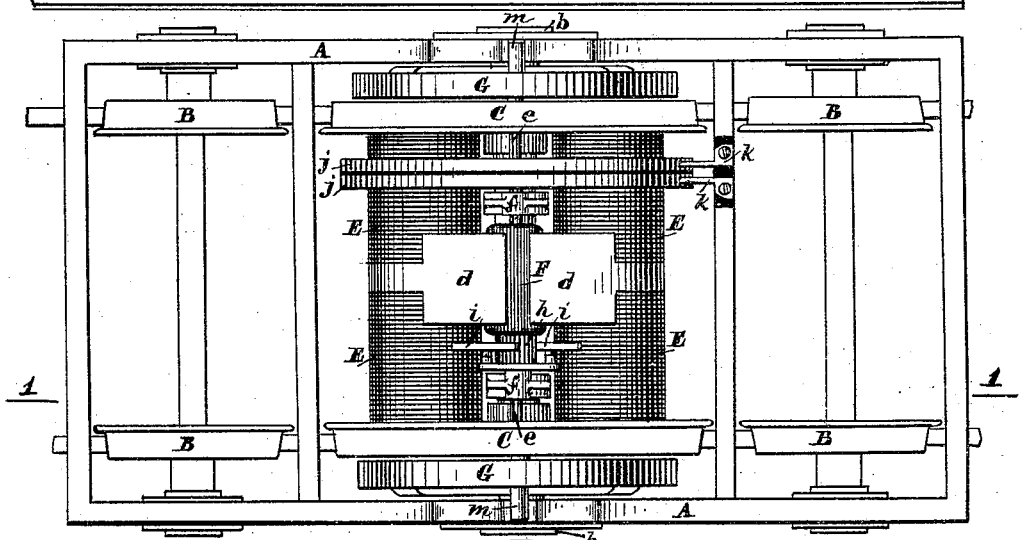
Figure 3:
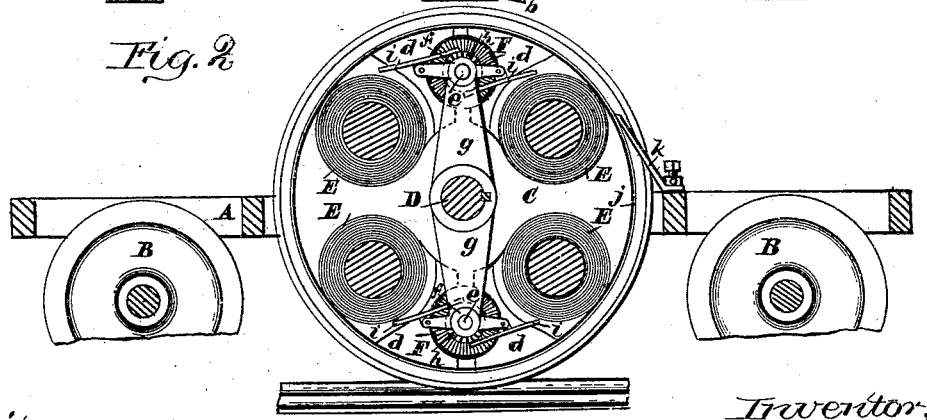
Figure 4:
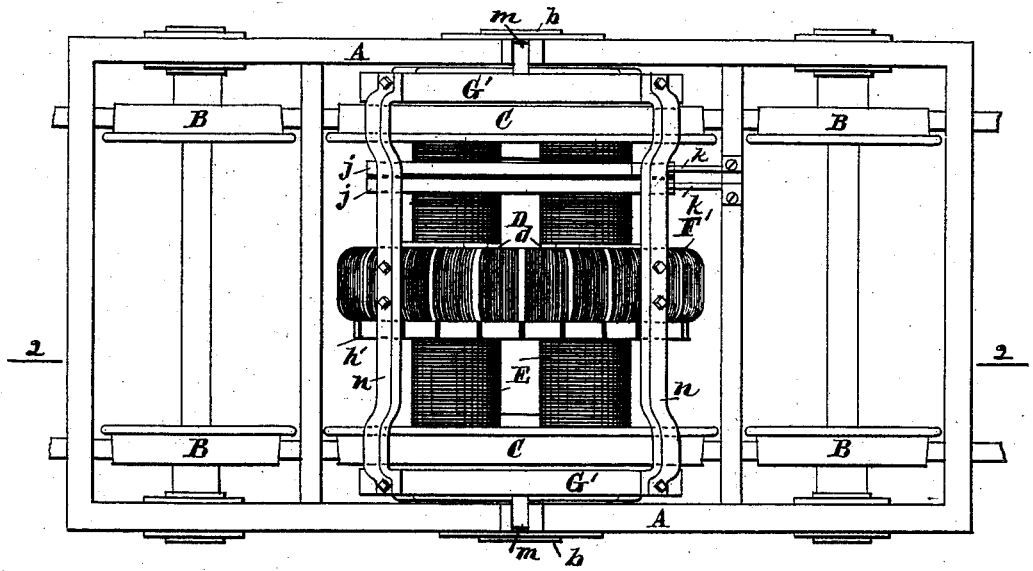
Figure 5:
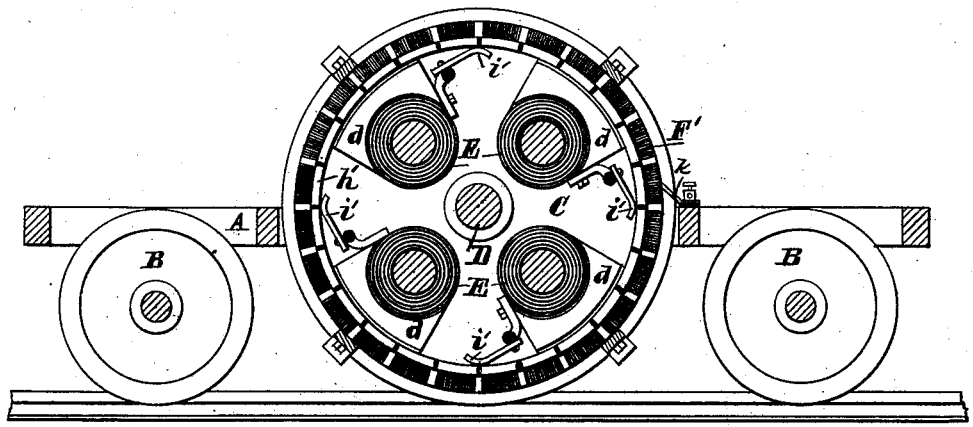

In the drawings, two sheets, Figure 1 is a side view of a locomotive embodying my invention in which gearing is employed. Fig. 2 is a plan view of the same. Fig. 3 is a vertical longitudinal section in the direction of lines 1 1 in Fig. 2. Fig. 4 illustrates a modification, being a plan view of a locomotive embodying my invention in which gearing is not employed. Fig. 5 is a vertical longitudinal section in the direction of lines 2 2 in Fig. 4.

The frame A may be of any construction suitable for the vehicle. I have shown four ordinary truck-wheels B, between which and the frame intervene springs $a$ of any desirable form. There may be a greater or less number of these truck-wheels and they may be a part of one or more pivoted trucks, as is well understood in the art. If four driving-wheels were employed, or two driving-wheels, one forward of the other, as might be the case with a hanging vehicle in telpherage, the truck-wheels might be dispensed with, as is customary. The two driving-wheels C on the same axle D may be joined together rigidly by means of the axle in the usual manner. For this axle are boxes $b$, between which and the frame are springs $c$.

I fix the field-magnets E of the motor rigidly with reference to the driving-wheels. When gearing is to be employed, the field-magnets E are so constructed and arranged that their poles $d$ are in convenient position to receive armatures F, as many as may be required—two in this case—between them. Each armature is on a shaft $e$, which has bearings $f$, which travel with the driving-wheels, being supported in fixed relation thereto, as by arms $g$, fastened rigidly to the axle D. The coils of field-magnets and armatures, the commutators $h$, and brushes $i$ are located with reference to each other and are to be connected for the passage of electricity in a suitable manner and substantially as in an ordinary motor, and, as will be well understood, without further illustration or description herein.

The means for electrical connection with the motor may be such as are well known for connecting with a rotary body. I prefer to employ two insulated metallic rings $j$, concentric with the axle D and fastened on the exterior of the field-magnets. An insulated brush $k$ bears on each ring $j$. With these brushes the electrodes to the motor and with these rings the electrodes to the coils will connect in the usual manner, whether the track-rail system, the conduit, the third or middle rail, or overhead-wire system be employed, or a storage-battery on the locomotive is used.

I prefer the simple means of gearing shown. Outside of each driving-wheel is a gear G—preferably internal—with which engage pinions $l$, one on each end of each armature-shaft, these shafts $e$ extending through the driving-wheels. Each gear G is held so as to be concentric with the axle of the driving-wheels by having a hub, through which the axle D extends. Thus the gears G conform with the driving-wheels in their vertical movement with reference to the frame or body of the vehicle, and the pinions and gears maintain exactly their proper relative positions. Each gear G is prevented from revolving, which may be done in a very simple manner by means of a pin or projection $m$ thereon, which extends into a vertical slot in the frame, as shown.

When reduction of speed is not required, and hence no gearing is necessary, the arrangement may be such as is illustrated by Figs. 4 and 5, according to which the armature F' is prevented from revolving, being connected by cross-pieces $n$ to rings G', which correspond with respect to position to the gears G and are in like manner held and supported, the construction of the field-magnets being substantially the same as when gearing is employed, as set forth. Electric connection is also made with the motor by means of the rings $j$ and brushes $k$, the brushes $i'$, which bear on the armature-commutator, also revolving with the driving-wheels, while said commutator $h'$ is joined to the armature and does not revolve.

I desire to note again and at this point that the most important feature of my invention is such construction whereby that part of an electric motor—of the class having field-magnets each of which is in operation magnetized constantly in the same sense—which is by far the heavier part—namely, the field-magnets—will revolve with the driving wheel or wheels, said magnets and driving wheel or wheels being as one body, which rolls on the track, so that there need be no bearings for supporting these magnets on the axles, at which there would be friction. Since, however, the majority of electrically-propelled vehicles are for heavy work, so that not only a reduction of speed is required, but also the armature, connections of armature with the field-magnets, and the gearing are of considerable weight, it is desirable in most cases to also combine other parts of the motor and parts of the motive mechanism with the driving-wheels to revolve therewith, as above described.

The field-magnets may be of different known shapes, and the armatures have the corresponding relation thereto and be combined with the driving-wheels, substantially as above set forth, and whereby my invention would be involved.

The operation and utility of a device embodying my invention are apparent from the above description. Revolution of the armatures of Fig. 1 on their own axes will cause by means of the pinions and gears revolution of the driving-wheels and the motor therewith. Many examples will occur which demonstrate the fact that a load may be propelled much easier over a way if it is put in a shape to roll evenly thereon than if supported on an axle or the like, whereby there are bearings which necessitate sliding friction.

I claim as my invention—

1. The combination, with a vehicle, of an electric motor of which the field-magnet is fixed to the driving wheel or wheels, the armature is connected with to react on the frame or body of the vehicle, and the coils of the field have a constant connection with the electric circuit, substantially as set forth.

2. The combination of a wheel, an electric motor fixed thereto to revolve therewith, and a gear which does not revolve, the armature of the motor being on a shaft which is eccentric to the axis of said wheel, said shaft being provided with a pinion in engagement with said gear, substantially as specified.

3. In an electric locomotive, the combination of the frame, driving-wheels, an electric motor fixed to the driving-wheels, and a gear held by said frame, whereby it cannot revolve, the armature of the motor being on a shaft eccentric to the axle of the driving-wheels and provided with a pinion which engages with said gear, substantially as set forth.

4. In an electric locomotive, the combination of two driving-wheels on the same axle, field-magnets fastened rigidly with reference to said wheels, an armature on a shaft eccentric to said axle, a gear concentric with said axle, and a pinion on said shaft which engages with said gear, substantially as described.

5. The combination of a vehicle, electric motor, and electric circuit in which the armature of the motor is connected with the frame or body of the vehicle, the field-magnet of the motor is fixed with reference to the driving-wheel, and the coils of the field form a constant part of the electric circuit, so that the armature reacts on the body or frame of the vehicle to cause rotation of the driving-wheel and the field of force is constant and rotates with the driving-wheel, substantially as and for the purposes set forth.

6. In an electric locomotive, the combination of two driving-wheels, field-magnets fixed to said wheels and providing several fields of force, which rotate with said wheels, being fixed in position with reference thereto, and armatures geared to the frame or body of the locomotive, substantially as set forth.

EDWARD DUMMER.

Witnesses:
WM. E. WOODWARD, Jr.,
WILLARD E. SIBLEY.